US010288721B2

(12) United States Patent
Paap et al.

(10) Patent No.: US 10,288,721 B2
(45) Date of Patent: May 14, 2019

(54) RADAR ADJUSTMENT FIXTURE AND METHOD

(71) Applicant: Honda Motor Co., Ltd., Tokyo (JP)

(72) Inventors: Erich A. Paap, Powell, OH (US); Michael Jon Ambrozich, Powell, OH (US); Travis Michael Duerstock, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 15/677,065

(22) Filed: Aug. 15, 2017

(65) Prior Publication Data

US 2019/0056480 A1    Feb. 21, 2019

(51) Int. Cl.
 *G01B 5/25* (2006.01)
 *G01S 7/40* (2006.01)
 *G01B 11/27* (2006.01)
 *G01S 13/93* (2006.01)

(52) U.S. Cl.
 CPC .......... *G01S 7/4026* (2013.01); *G01B 11/272* (2013.01); *G01S 2013/9375* (2013.01)

(58) Field of Classification Search
 CPC .................................................. G01S 7/4026
 USPC .................. 33/228, 286, 299, 600, 613, 645
 See application file for complete search history.

(56) References Cited

U.S. PATENT DOCUMENTS

| | | | |
|---|---|---|---|
| 3,696,694 A | 10/1972 | Boro | |
| 4,913,007 A | 4/1990 | Reynolds | |
| 6,363,619 B1* | 4/2002 | Schirmer | G01B 11/27 33/288 |
| 6,823,601 B2 | 11/2004 | Murray | |
| 7,346,994 B2 | 3/2008 | Shevela | |
| 7,637,182 B1 | 12/2009 | Long | |
| 8,810,802 B2 | 8/2014 | Schmidt et al. | |
| 8,830,119 B2* | 9/2014 | Borruso | G01S 7/4972 33/288 |
| 9,352,651 B2 | 5/2016 | Formey | |
| 2001/0008446 A1* | 7/2001 | Hopfenmuller | G01B 11/27 356/139.09 |
| 2005/0096807 A1* | 5/2005 | Murray | G01B 11/272 33/288 |
| 2008/0229589 A1 | 9/2008 | Bone | |

(Continued)

FOREIGN PATENT DOCUMENTS

DE    102010007934    8/2011
KR       200477706    7/2005

(Continued)

*Primary Examiner* — George B Bennett
(74) *Attorney, Agent, or Firm* — Rankin, Hill & Clark LLP

(57) ABSTRACT

A radar adjustment fixture and method for adjusting a radar device on a vehicle includes a base having wheels for moving on a ground surface, at least one adjustment tool mounted on the base, and at least one manipulator mounted on the base for adjusting an adjustable proximate distance to thereby adjust a vertical height of the at least one adjustment tool. The at least one adjustment tool is located proximally relative to the base and located said adjustable proximate distance relative to the ground surface. The at least one manipulator adjusts said adjustable proximate distance to thereby adjust a vertical height of the at least one adjustment tool. The at least one manipulator is located distally relative to the base and the at least one adjustment tool.

20 Claims, 4 Drawing Sheets

(56) References Cited

U.S. PATENT DOCUMENTS

| | | | | |
|---|---|---|---|---|
| 2010/0186244 A1* | 7/2010 | Schwindt | ............... | B60R 11/04 |
| | | | | 33/288 |
| 2015/0096180 A1* | 4/2015 | Johnson | .................. | G01C 9/02 |
| | | | | 33/228 |
| 2019/0004147 A1* | 1/2019 | Conrad | ................ | G01S 7/4004 |

FOREIGN PATENT DOCUMENTS

| | | |
|---|---|---|
| RU | 2422687 | 6/2011 |
| WO | 9405466 | 3/1994 |

* cited by examiner

RADAR ADJUSTMENT FIXTURE AND METHOD

BACKGROUND

Increasingly, radar sensors are mounted on vehicles for providing information on the surrounding environment relative to the vehicle. Often, the radar sensor requires precise alignment on the vehicle. In a known mounting, the radar sensor is mounted to the vehicle and then is adjustable via two screws. A known system is capable of checking for alignment of the radar sensor and instructs the manufacturer as to how to adjust the radar sensor (e.g., how much to tighten or loosen the two screws). Typically, an assembly line worker uses a conventional screwdriver to adjust the screws in a manner instructed by the known system. This can be inefficient if the radar sensor is mounted too low on the vehicle.

SUMMARY

According to one aspect, a radar adjustment fixture for adjusting a radar device on a vehicle includes a base having wheels for moving on a ground surface, at least one adjustment tool mounted on the base, and at least one manipulator mounted on the base for adjusting an adjustable proximate distance to thereby adjust a vertical height of the at least one adjustment tool. The at least one adjustment tool is located proximally relative to the base and located said adjustable proximate distance relative to the ground surface. The at least one manipulator adjusts said adjustable proximate distance to thereby adjust a vertical height of the at least one adjustment tool. The at least one manipulator is located distally relative to the base and the at least one adjustment tool.

According to another aspect, an adjustment fixture for adjusting a device mounted low on a vehicle includes a base and an adjustment tool mounted on the base and proximate the base. The adjustment tool is movable relative to the base to be adjustably positioned relative to a ground surface. The adjustment fixture further includes a manipulator fixedly mounted relative to the adjustment tool for moving the adjustment tool relative to the base, and thereby relative to the ground surface. The manipulator is mounted distal relative to the base for enabling a standing operator to adjust a vertical height of the adjustment tool.

According to a further aspect, a radar adjustment method for adjusting a radar device on a vehicle includes moving a base of a radar adjustment fixture over a ground surface to a location proximate to the vehicle via the wheels and moving a manipulator mounted to the base to vertically adjust an adjustable proximate distance of at least one adjustment tool mounted on the base to align the at least one adjustment tool relative to the radar device on the vehicle. The at least one adjustment tool is located proximate the ground surface and the manipulator is located distally relative to the ground surface.

DETAILED DESCRIPTION

Figure 1:
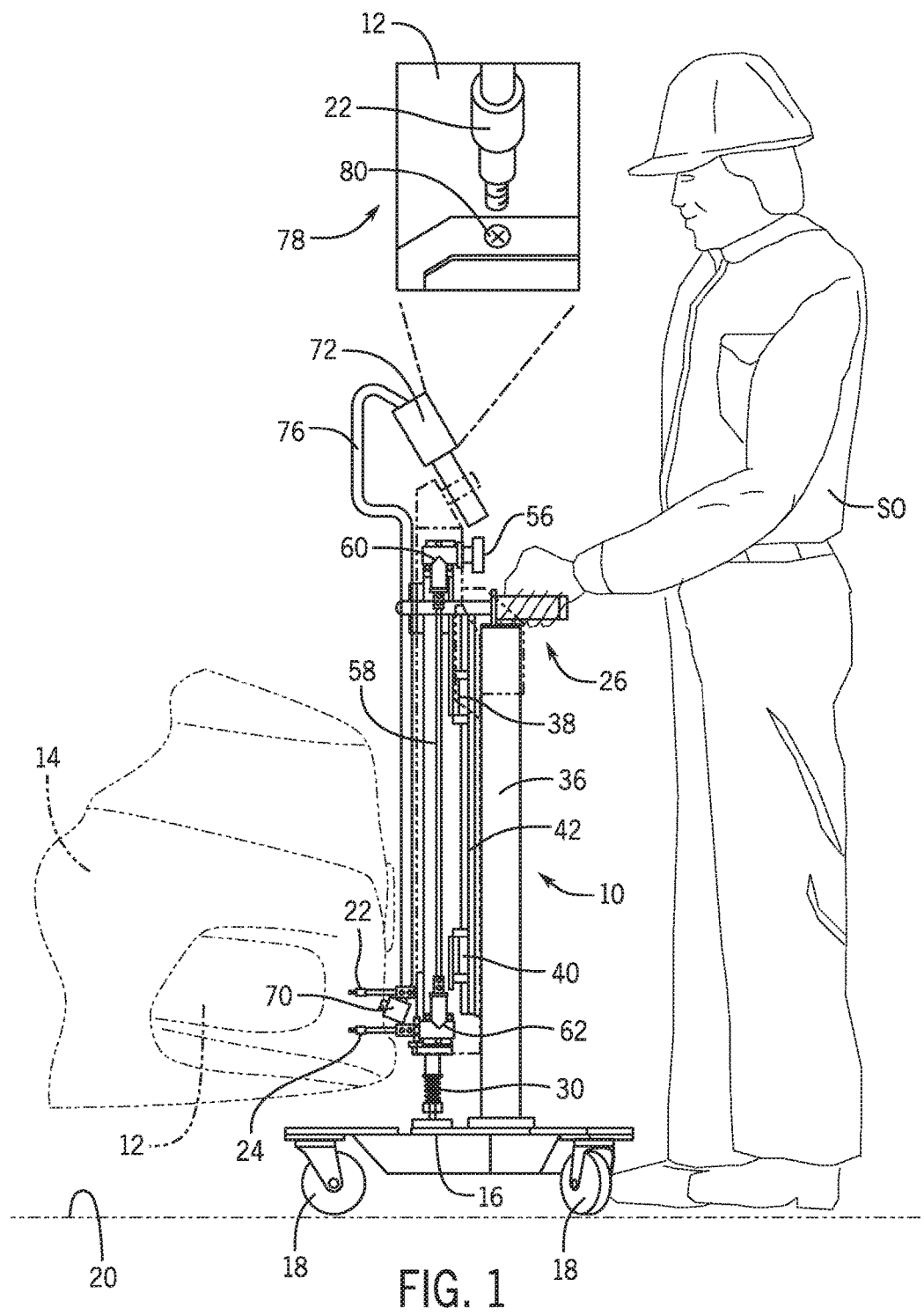
FIG. 1 is a schematic elevation view of a radar adjustment fixture for adjusting a radar device on a vehicle according to an exemplary embodiment.

Referring now to the drawings wherein the showings are for purposes of illustrating one or more exemplary embodiments and not for purposes of limiting the same, FIG. 1 schematically shows a radar adjustment fixture 10 for adjusting a radar device 12 on a vehicle 14 according to an exemplary embodiment. As shown, the radar adjustment fixture 10 of the illustrated embodiment includes a base 16 having wheels 18 for moving on a ground surface 20. The radar adjustment fixture 10 further includes at least one adjustment tool (e.g., first adjustment tool 22 and second adjustment tool 24) mounted on the base 16 and at least one manipulator (e.g., handle manipulator 26) mounted on the base 16.

Figure 4A:
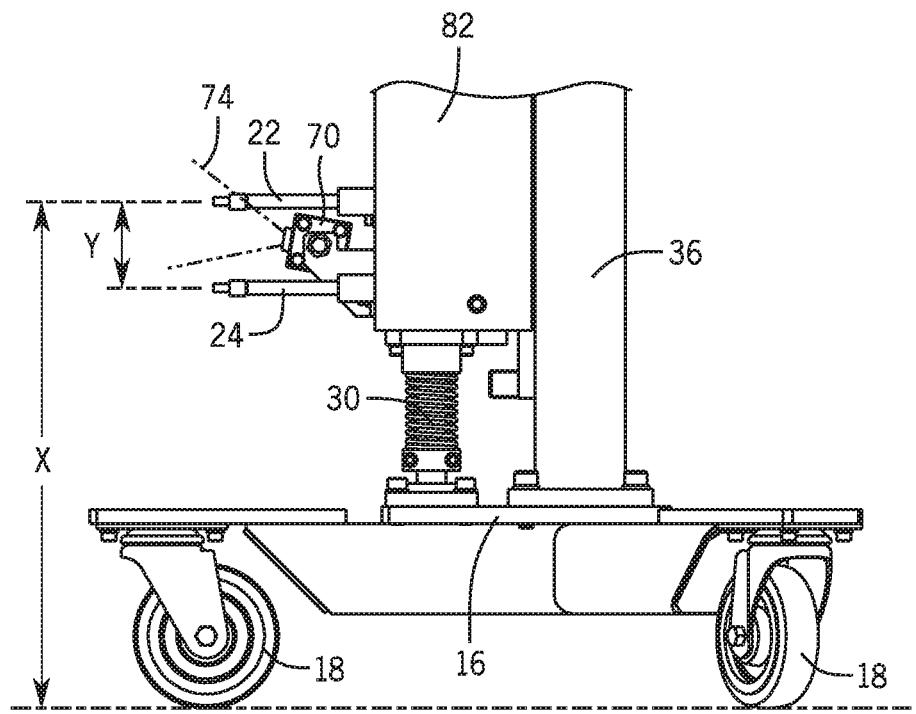
FIG. 4A is a partial enlarged elevational view of the lower portion of the radar adjustment fixture showing adjustment tools thereof located a first adjustable proximate distance (X) relative to a ground surface.
Figure 4B:
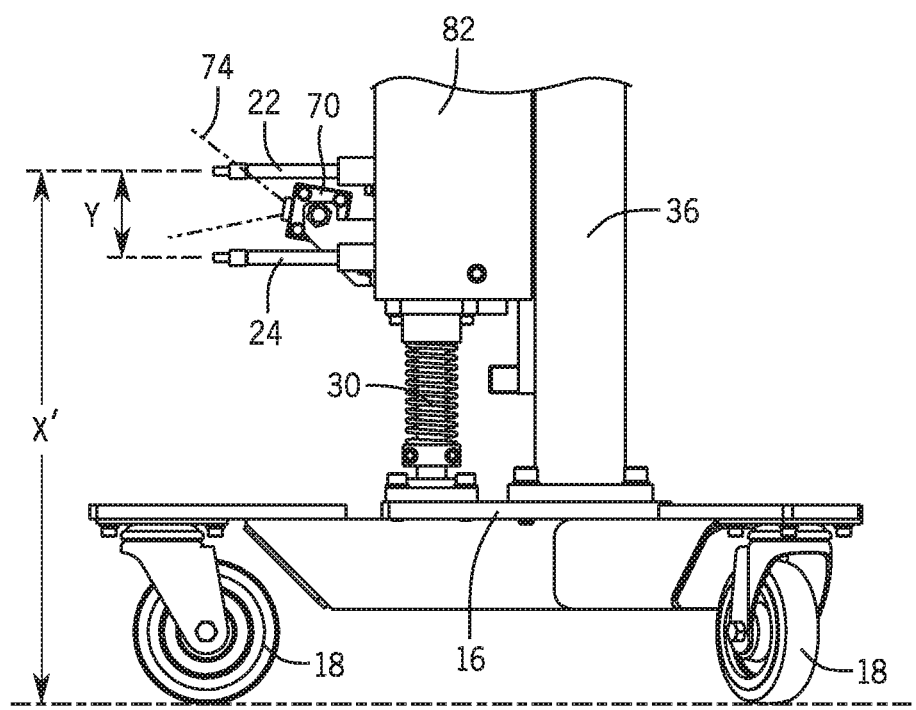
FIG. 4B is a partial enlarged elevational view similar to FIG. 4A but showing the adjustment tools located a second adjustable proximate distance (X') relative to the ground surface.

As will be described in more detail below, the at least one adjustment tool 22, 24 is located proximally relative to the base 16 and located an adjustable proximate distance (e.g., distance X or X' in FIGS. 4A and 4B) relative to the ground surface 20. As will be also further discussed below, the at least one manipulator 26 is provided for adjusting the adjustable proximate distance to thereby adjust a vertical height of the at least one adjustment tool 22, 24. The at least one manipulator 26 is located distally relative to the base 16 and distally relative to the at least one adjustment tool 22, 24. In other words, the at least one adjustment tool 22, 24 is located close to or closer to the base 16 than the at least one manipulator 26, which is located farther away and distally relative to the base 16. Advantageously, the adjustment fixture 10 allows for adjusting a device (e.g., radar device 12) mounted low on a vehicle (e.g., vehicle 14). While described in association for mounting the radar device 12 on the vehicle 14, it is to be appreciated that the adjustment fixture 10 could be used and optionally adapted to adjust, mount or otherwise interact with some other device disposed on a vehicle.

In the illustrated embodiment, the at least one adjustment tool 22, 24 includes first adjustment tool 22 and second adjustment tool 24. The adjustment tools 22, 24 are disposed on the adjustment fixture 10 so as to be mounted in a fixed orientation relative to one another (i.e., the second adjustment tool 24 is fixedly arranged relative to the first adjustment tool 22). In particular, each of the first and second adjustment tools 22, 24 is mounted on the base 16 via some intermediate elements described hereinbelow and both are mounted or disposed proximate the base 16 (i.e., adjacent the base 16). The adjustment tools 22, 24 are movable relative to the base 16 to be adjustably positioned relative to the ground surface 20.

The radar adjustment fixture 10 can further include a spring 30 urging the adjustment tools 22, 24 upwardly away from the base 16 to facilitate ease of adjusting the adjustable proximate distance when raising the adjustment tools 22, 24 relative to the ground surface 20. The spring 30 can be interposed between the base 16 and the adjustment tools 22, 24. More particularly, in the illustrated embodiment, the spring 30 is arranged between the second adjustment tool 24 and the base 16 but, via the fixed relationship between the first and second adjustment tools 22, 24, the spring 30 urges both adjustment tools 22, 24 upward.

Counterbalancing the force of the spring 30 is the weight of the elements movably mounted to the base 16 together with the adjustment tools 22, 24. Such counterbalancing facilitates ease in raising and lowering the at least one manipulator 26 and thereby ease in adjusting the adjustable proximate distance. As shown, the spring 30 can be mounted on one of the pair of rod members or posts 84 associated with the adjustment tool 24 for providing stability for the adjustment tools 22, 24 and guiding vertical movement thereof. Optionally, adjacent rod member or post 84 can be disposed between the base 16 and the first adjustment tool 22.

In the illustrated embodiment, leg members 32 extend from the base toward the wheels 18 and provide a structure to which the wheels 18 are mounted via mounting plates 34. A vertical guide structure or housing 36 is orthogonally and fixedly mounted to the base 16 and the at least one manipulator 26 and the adjustment tools 22, 24 are together slidably mounted relative to the vertical guide structure 36. The guide structure 36 has at least one collar device (e.g., collar devices 38, 40) through which at least one rod 42 is slidably received. The at least one rod 42 is fixedly mounted to the at least one manipulator 26 and to the adjustment tools 22, 24. Accordingly, movement of the adjustment tools 22, 24 occurs by moving the at least one manipulator 26, which is connected to the adjustment tools via the at least one rod 42. One or more additional housing structures 82 can be provided together with the at least one rod 42, the at least one manipulator 26 and the adjustment tools 22, 24 for movement therewith relative to the base 16 and the guide structure 36 to enclose internally the at least one rod 42 and the components described hereinbelow that are connected to the adjustment tools (e.g., shaft 58, gear housings 60, 62, etc.).

The radar adjustment fixture 10 can further include a locking device 50 that selectively locks the adjustable proximate distance to a desired distance to thereby set the vertical height of the adjustment tools 22, 24 relative to the ground surface 20. As shown, the locking device 50 is located distally relative to the base 16 and the adjustment tools 22, 24. The locking device 50 can use a cam, screw or other mechanical relationship to apply a locking force against the at least one rod 42 to prevent relative movement of the rod, and thereby the adjustment tools 22, 24, relative to the guide structure 36 and the base 16. For example, the locking device 50 can be a standard rail clamp fixedly secured to and/or relative to the guide structure 36. When the handle 50a of the locking device 50 is rotated, the locking device 50 can apply a locking force and/or engagement with the at least one rod 42 to lock the position of the first and second adjustment tools 22, 24. In one embodiment, the locking device 50 is a clamping unit for a linear guide sold by MISUMI USA in Schaumburg, Ill.

The radar adjustment fixture 10 of the illustrated embodiment also includes an upper housing structure 52. The at least one manipulator (e.g., handle manipulator 26) is fixedly mounted to the upper housing structure 52 and thus the first and second adjustment tools 22, 24 are likewise fixedly mounted to the upper housing structure 52. Accordingly, the upper housing structure 52 is movable together with the at least one manipulator 26 and the adjustment tools 22, 24 relative to the vertical guide structure 36 and the base 16. The at least one manipulator can be one or both the handle manipulator 26 that is fixed to the upper housing structure 52 and/or an underside 52a of the upper housing structure 52 (e.g., the standing operator SO could raise or lower the adjustment tools 22, 24 by simply using the upper housing structure 52). In one embodiment, the at least one manipulator is the handle manipulator 26 and includes a pair of handle grips 26a, 26b for adjusting the adjustable proximate distance and for moving the base 16 via the wheels 18 relative to the ground surface 20. It is contemplated that the handle grips 26a, 26b and thus the handle manipulator 26 could alternatively be used only for moving the base 16 via the wheels 18 over the ground surface 20 and a separate element could be used for vertically manipulating the first and second adjustment tools 22, 24 (e.g., the underside 52a of the upper housing structure 52 or some other element secured to the upper housing structure 52). In any case, a manipulator, such as the handle manipulator 26 of the illustrated embodiment, is fixedly mounted relative to the adjustment tools 22, 24 for moving the adjustment tools 22, 24 relative to the base 16 and thereby relative to the ground surface 20. Advantageously, the manipulator 26 is mounted distally relative to the base 16 for enabling standing operator SO (FIG. 1) to adjust a vertical height of the adjustment tools 22, 24.

The radar adjustment fixture 10 can further include at least one knob (e.g., knobs 54, 56) disposed adjacent the handle manipulator 26 and operatively connected to the adjustment tools 22, 24 so that rotation of the at least one knob is mechanically transferred into rotation of the adjustment tools 22, 24. In the illustrated embodiment, the at least one knob 54, 56 includes first knob 54 and second knob 56. The first knob 54 is operatively connected to the first adjustment tool 22 so that rotation of the first knob 54 is mechanically transferred into rotation of the first adjustment tool 22. Likewise, the second knob 56 is operatively connected to the second adjustment tool 24 so that rotation of the second knob 56 is mechanically transferred into rotation of the second adjustment tool 24. In the illustrated embodiment, the first and second knobs 54, 56 are mounted to the upper housing structure 52.

Figure 2:
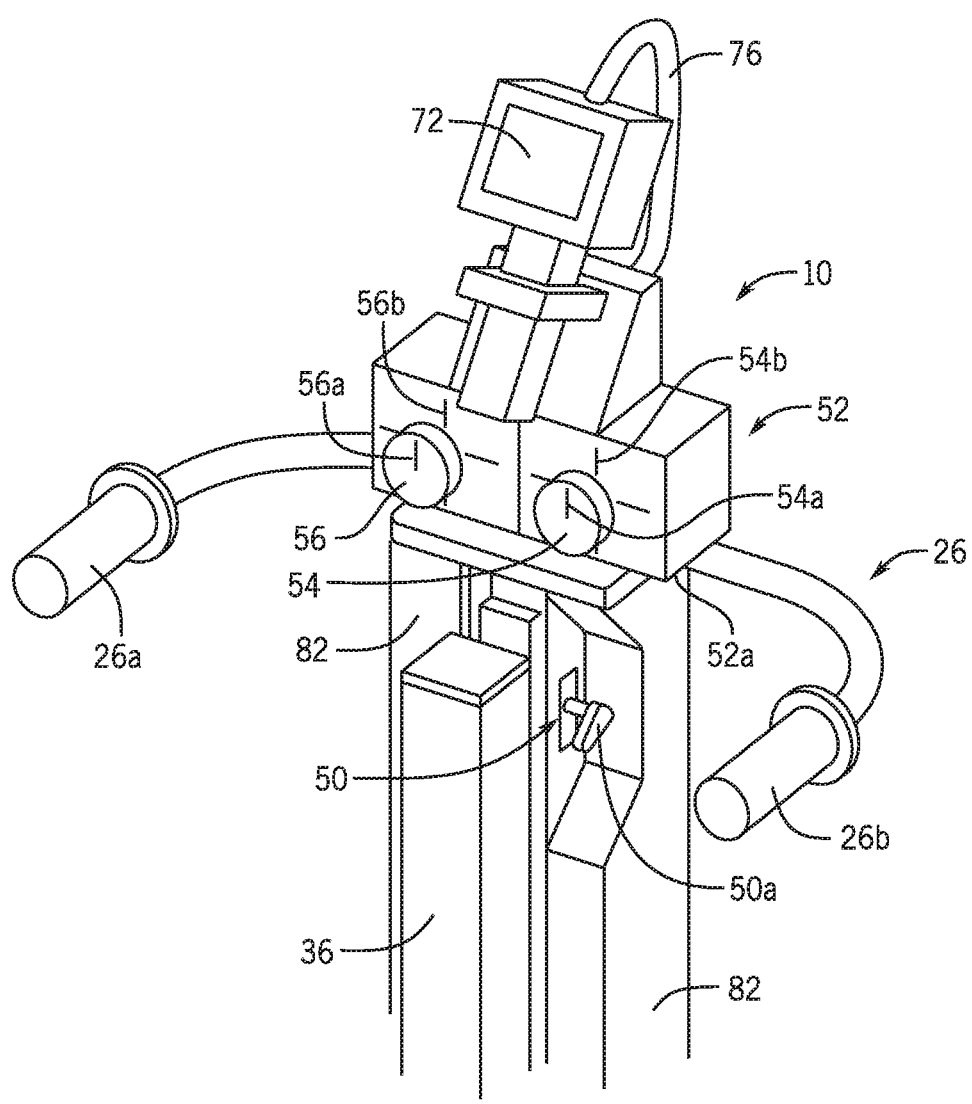
FIG. 2 is a partial enlarged perspective view of an upper portion of the radar adjustment fixture of FIG. 1.
Figure 3:
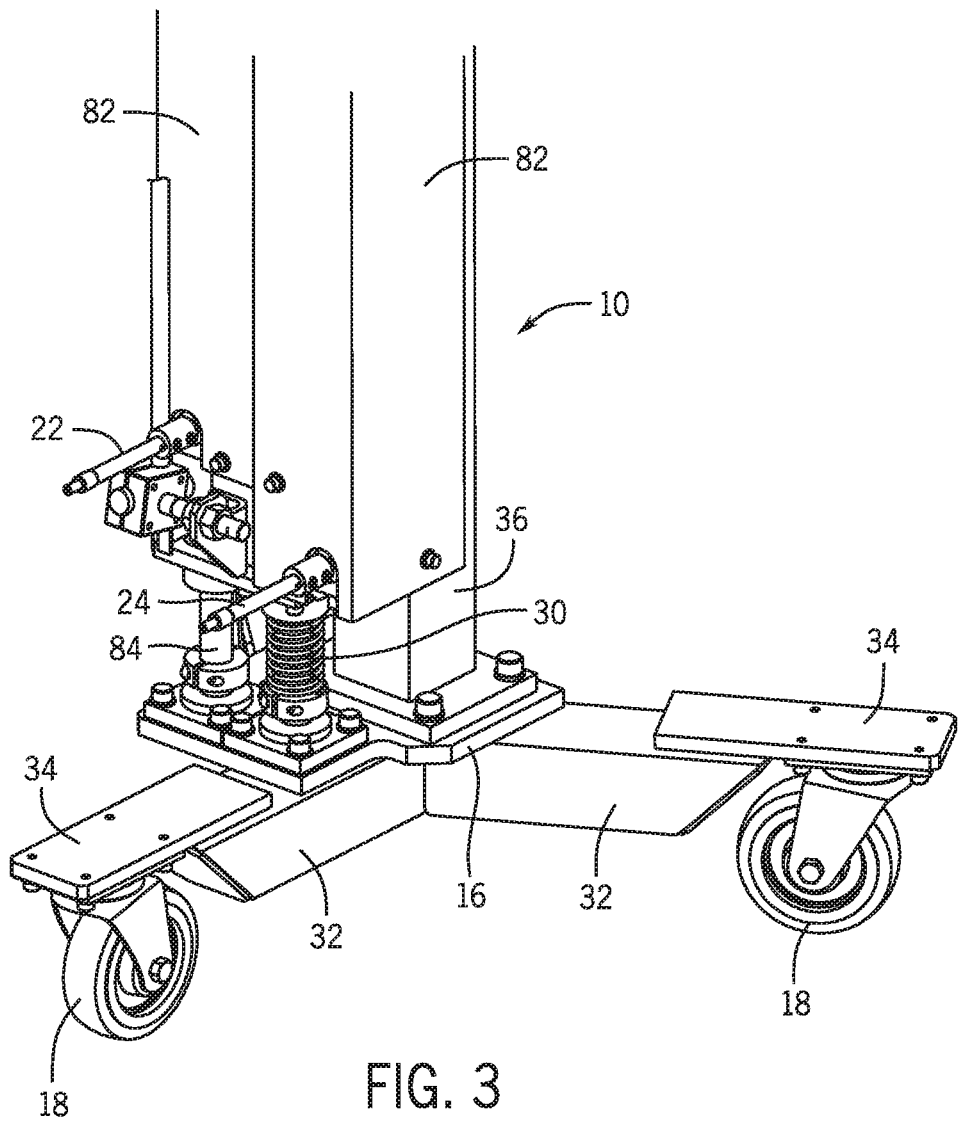
FIG. 3 is a partial enlarged perspective view of a lower portion of the radar adjustment fixture of FIG. 1.

As best shown in FIG. 2, the first and second knobs 54, 56 and the upper housing structure 52 can include indicia 54a, 54b, 56a, 56b disposed thereon to indicate a relative amount of rotation of the first and second knobs 54, 56 and thereby a relative amount of rotation of the first and second adjustment tools 22, 24. More particularly, the first knob 54 can include knob indicia 54a thereon and the second knob 56 can include knob indicia 56a thereon. The upper housing structure 52 can include reference indicia 54b, 56b thereon surrounding, respectively, the knobs 54, 56 such that relative rotation of the first and second knobs 54, 56 can be observed. More particularly, the indicia 54a, 54b, 56a, 56b provides incremental markings to indicate an amount of relative rotation of the knobs 54, 56 and thereby an amount of relative rotation of the adjustment tools 22, 24. As will be understood and appreciated by those skilled in the art, the knobs 54, 56 can be, respectively, operatively connected to the first and second adjustment tools 22, 24 via shafts or rods and appropriate gearing (e.g., shaft 58 and gear housings 60, 62 shown in FIG. 1).

The radar adjustment fixture 10 further includes a camera 70 and a display device 72. As shown, the camera 70 is mounted proximate to the adjustment tools 22, 24 for capturing alignment of the adjustment tools 22, 24 with the radar device 12. More particularly, in the illustrated embodiment, the camera 70 is mounted proximate to the first adjustment tool 22 with a field of vision 74 arranged to facilitate alignment of the first adjustment tool 22 with the radar device 12 mounted on the vehicle 14. For example, the camera 70 can capture alignment of the first adjustment tool 22 with adjustment screw 80 on the radar device 12 (i.e., in this embodiment, the first adjustment tool 22 can be a screwdriver type tool appropriate for engaging and adjusting the adjustment screw 80). Thus, camera 70 may be precisely arranged so that the field of vision 74 only captures alignment of the first adjustment tool 22 with the radar device 12.

The display device 72 is operatively connected to the camera 70, such as through cable or line 76. The display device 72 is mounted distally relative to the adjustment tools 22, 24 and proximally relative to the manipulator 26 to display the alignment of the first adjustment tool 22 with the radar device 12 in a convenient location for the standing operator SO. The display device 72 displays the field of vision 74 as captured by the camera as a screen representation 78 for the standing operator SO to observe. By this arrangement, the camera 70 only captures alignment of the first adjustment tool 22 relative to the radar device 12 and alignment of the second adjustment tool 24 can be inferred based on alignment of the first adjustment tool 22 with the radar device 12. In alternate embodiments, the camera 70 can be arranged to capture alignment of the second adjustment tool 24 as a substitute for the first adjustment tool 22 or in addition to the first adjustment tool 22.

In FIG. 1, exemplary screen representation 78 is illustrated. The screen representation 78 shows the first adjustment tool 22 being aligned with the radar device 12. In particular, the screen representation 78 can show the first adjustment tool 22 aligning relative to the screw 80 on the radar device 12. Again, alignment of the first adjustment tool 22 relative to the screw 80 can be used to infer alignment of the second adjustment tool 24 relative to a second screw (not shown) on the radar device 12. Advantageously, the standing operator SO remains in an ergonomically preferred position and is not required to use a manual screwdriver to adjust the radar device 12 on the vehicle 14.

A radar adjustment method for adjusting a radar device on a vehicle will now be described to explain operation of the radar adjustment fixture 10. In the method, the base 16 of the radar adjustment fixture 10 is moved over the ground surface 20 to a location proximate to the vehicle 14 via the wheels 18 (e.g., the location of FIG. 1). The manipulator 26 can then be moved to adjust an adjustable proximate distance of the first adjustment tool 22 mounted on the base 16 to align the first adjustment tool 22 relative to the radar device 12 on the vehicle 14. In particular, with reference to FIGS. 4A and 4B, the manipulator 26 can be moved to change the vertical height of the adjustment tools 22, 24. For example, the manipulator 26 can be moved to change (and increase) the adjustable proximate distance from X in FIG. 4A to X' in FIG. 4B. The spring 30 facilitates this increase in the adjustable proximate distance by proving a lifting force as described hereinabove.

The spring 30 urges the position of the adjustment tools 22, 24 vertically upwardly and is counterbalanced by the weight of the tools 22, 24 and the elements fixedly mounted thereto (e.g., the handle manipulator 26, the upper housing structure 52, and further housing structures 82 surrounding the shafts and gear housings (e.g., shaft 58 and gear housings 60, 62)). Alignment of the first adjustment tool 22 relative to the radar device 12 can be captured via the camera 70 mounted to the base 16. This alignment can be displayed on the display device 72 mounted adjacent the manipulator 26 and positioned distally relative to the ground surface 20. The standing operator SO can use the screen representation 78 to align the first adjustment tool 22 with the radar device 12 and thereby the second adjustment tool 24 with the radar device 12 as described herein above. Once aligned (and engaged) the knobs 54, 56 can be selectively rotated to thereby rotate the first and second adjustment tools 22, 24 for adjusting the radar device 12 on the vehicle 14.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A radar adjustment fixture for adjusting a radar device on a vehicle, comprising:
a base having wheels for moving on a ground surface;
at least one adjustment tool mounted on the base, the at least one adjustment tool located proximally relative to the base and located an adjustable proximate distance relative to the ground surface; and
at least one manipulator mounted on the base for adjusting said adjustable proximate distance to thereby adjust a vertical height of the at least one adjustment tool, the at least one manipulator located distally relative to the base and the at least one adjustment tool.

2. The radar adjustment fixture of claim 1 further including a spring urging the at least one adjustment tool upward away from the base to facilitate ease of adjusting the adjustable proximate distance when raising the at least one adjustment tool relative to the ground surface, the spring interposed between the base and the at least one adjustment tool.

3. The radar adjustment fixture of claim 2 further including a locking device that selectively locks the adjustable proximate distance to a desired distance to thereby set the vertical height of the at least one adjustment tool relative to the ground surface, the locking device located distally relative to the base and the at least one adjustment tool.

4. The radar adjustment fixture of claim 3 further including a vertical guide structure orthogonally and fixedly mounted to the base and the at least one manipulator and at least one adjustment tool together slidably mounted relative to the vertical guide structure, the guide structure having at least one collar device through which a rod is slidably received, the rod fixedly mounted to the at least one manipulator and the at least one adjustment tool.

5. The radar adjustment fixture of claim 1 further including:
a camera mounted proximate to the at least one adjustment tool for capturing alignment of the at least one adjustment tool with the radar device; and
a display device operatively connected to the camera and mounted distally relative to the at least one adjustment tool and proximally relative to the at least one manipulator to display said alignment of the at least one adjustment tool with the radar device.

6. The radar adjustment fixture of claim 5 wherein the at least one adjustment tool includes a first adjustment tool and a second adjustment tool fixedly arranged relative to the first adjustment tool, and wherein the camera only captures alignment of the first adjustment tool relative to the radar device, and further wherein alignment of the second adjustment tool is inferred based on alignment of the first adjustment tool with the radar device.

7. The radar adjustment fixture of claim 1 further including at least one knob disposed adjacent the at least one manipulator and operatively connected to the at least one adjustment tool so that rotation of the at least one knob is mechanically transferred into rotation of the least one adjustment tool.

8. The radar adjustment fixture of claim 7 wherein the at least one knob includes a first knob and a second knob and the at least one adjustment tool includes a first adjustment tool and a second adjustment tool, the first knob operatively connected to the first adjustment tool so that rotation of the first knob is mechanically transferred into rotation of the first adjustment tool and the second knob operatively connected to the second adjustment tool so that rotation of the second knob is mechanically transferred into rotation of the second adjustment tool.

9. The radar adjustment fixture of claim 8 further including an upper housing structure to which the first and second knobs are mounted, the first and second knobs and the upper housing structure including indicia disposed thereon to indicate a relative amount of rotation of the first and second knobs and thereby a relative amount of rotation of the first and second adjustment tools.

10. The radar adjustment fixture of claim 7 wherein the at least one knob is mounted to an upper housing structure, and further wherein the upper housing structure and the at least one knob include incremental markings to indicate an amount of relative rotation of the at least one knob and thereby an amount of relative rotation of the at least one adjustment tool.

11. The radar adjustment fixture of claim 10 wherein the at least one manipulator is one of an underside of the upper housing structure or a handle manipulator fixed to the upper housing structure.

12. The radar adjustment fixture of claim 11 wherein the at least one manipulator is the handle manipulator including a pair of handle grips for adjusting the adjustable proximate distance and for moving the base via the wheels relative to the ground surface.

13. The radar adjustment fixture of claim 1 wherein the at least one manipulator is a handle manipulator including a pair of handle grips for adjusting the adjustable proximate distance and for moving the base via the wheels relative to the ground surface.

14. An adjustment fixture for adjusting a device mounted low on a vehicle, comprising:
    a base;
    an adjustment tool mounted on the base and proximate the base, the adjustment tool movable relative to the base to be adjustably positioned relative to a ground surface; and
    a manipulator fixedly mounted relative to the adjustment tool for moving the adjustment tool relative to the base and thereby relative to the ground surface, the manipulator mounted distal relative to the base for enabling a standing operator to adjust a vertical height of the adjustment tool.

15. The adjustment fixture of claim 14 further including:
    a spring interposed between the adjustment tool and the base for urging the adjustment tool in a direction away from the base; and
    a locking device arranged to selectively lock the position of the adjustment tool relative to the base and the ground surface.

16. The adjustment fixture of claim 14 further including:
    a camera mounted proximate to the adjustment tool with a field of vision arranged to facilitate alignment of the adjustment tool with the device mounted on the vehicle; and
    a display device operatively connected to the camera and mounted distally relative to the adjustment tool and proximally relative to the manipulator to display the field of vision of the camera.

17. The adjustment fixture of claim 14 wherein the adjustment tool is a first adjustment tool and the adjustment fixture further includes:
    a second adjustment tool mounted to the base and proximate the base, the second adjustment tool fixedly arranged relative to the first adjustment tool;
    an upper housing having first and second knobs operatively connected, respectively, to the first and second adjustment tools for transferring rotation of the first and second knobs, respectively, to the first and second adjustment tools.

18. A radar adjustment method for adjusting a radar device on a vehicle, comprising:
    moving a base of a radar adjustment fixture over a ground surface to a location proximate to the vehicle via wheels;
    moving a manipulator mounted to the base to vertically adjust an adjustable proximate distance of at least one adjustment tool mounted on the base to align the at least one adjustment tool relative to the radar device on the vehicle, wherein the at least one adjustment tool is located proximate the ground surface and the manipulator is located distally relative to the ground surface.

19. The radar adjustment method of claim 18 further including:
    capturing alignment of the at least one adjustment tool relative to the radar device via a camera mounted to the base;
    displaying the alignment on a display device mounted adjacent the manipulator and distally relative to the ground surface.

20. The radar adjustment method of claim 19 further including:
    rotating a knob mounted adjacent the manipulator and distally relative to the ground surface to rotate the at least one adjustment tool, the knob operatively connected to the at least one adjustment tool to transfer rotation of the knob into rotation of the at least one adjustment tool.

* * * * *